US008341671B2

(12) United States Patent
Lee et al.

(10) Patent No.: US 8,341,671 B2
(45) Date of Patent: Dec. 25, 2012

(54) SYSTEM AND METHOD FOR SYNCHRONING BROADCAST CONTENT WITH SUPPLEMENTARY INFORMATION

(75) Inventors: Goon Seop Lee, Seongnam-si (KR); Dong Hahk Lee, Seoul (KR); Jae Hwang Yu, Seoul (KR); Jong Tae Ihm, Seongnam-si (KR); Se Hyun Oh, Seoul (KR); Kang Il Koh, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 327 days.

(21) Appl. No.: 12/446,414

(22) PCT Filed: Jan. 8, 2008

(86) PCT No.: PCT/KR2008/000085
§ 371 (c)(1),
(2), (4) Date: Apr. 20, 2009

(87) PCT Pub. No.: WO2008/084947
PCT Pub. Date: Jul. 17, 2008

(65) Prior Publication Data
US 2010/0295992 A1 Nov. 25, 2010

(30) Foreign Application Priority Data

Jan. 8, 2007 (KR) .................. 10-2007-0002069
Aug. 29, 2007 (KR) .................. 10-2007-0087041

(51) Int. Cl.
*H04N 7/10* (2006.01)
*H04N 5/445* (2006.01)
*H04N 7/173* (2006.01)
*G06K 9/00* (2006.01)

(52) U.S. Cl. ............ 725/40; 725/32; 725/109; 382/253; 348/564

(58) Field of Classification Search .................. 725/109, 725/116, 32, 40; 382/253; 348/564
See application file for complete search history.

(56) References Cited

U.S. PATENT DOCUMENTS 5,436,674 A * 7/1995 Hirabayashi et al. ......... 348/699
(Continued)

FOREIGN PATENT DOCUMENTS

EP 1592237 11/2005
(Continued)

OTHER PUBLICATIONS

International Search Report mailed Mar. 19, 2008 for PCT/KR2008/000085.
(Continued)

*Primary Examiner* — James R Sheleheda
(74) *Attorney, Agent, or Firm* — Lowe Hauptman Ham & Berner, LLP

(57) ABSTRACT

Disclosed herein is a system and method for providing a supplementary information associated with a broadcast content. The system provides a supplementary information associated with a specific broadcast program in the broadcast content by means of a supplementary information server, wherein the supplementary information server comprises a broadcasting receiving unit for receiving the broadcast content; a synchronization information unit for storing a synchronization information of the supplementary information associated with the specific broadcast program; a video comparison unit for comparing screens of the broadcast content with a previously stored scene change screen of the specific broadcast program and setting a start time of the specific broadcast program; a supplementary information extracting unit for calculating an elapsed time from the start time of the specific broadcast program to a specific screen and extracting the supplementary information corresponding to the elapsed time. The supplementary information associated with the specific broadcast program in the broadcast content is provided through the steps of receiving a synchronization information of the supplementary information associated with the specific broadcast program; setting a start time of the specific broadcast program by comparing screens of the broadcast content with a previously stored scene change screen of the specific broadcast program; calculating an elapsed time corresponding to a specific screen based on the start time; extracting the supplementary information corresponding to the elapsed time.

18 Claims, 13 Drawing Sheets

U.S. PATENT DOCUMENTS

| | | | |
|---|---|---|---|
| 2001/0023436 A1* | 9/2001 | Srinivasan et al. | 709/219 |
| 2002/0108124 A1 | 8/2002 | Sato | |
| 2003/0126616 A1 | 7/2003 | Dewa | |
| 2004/0105495 A1* | 6/2004 | Lee | 375/240.16 |
| 2006/0256864 A1* | 11/2006 | Ju | 375/240.12 |
| 2006/0259938 A1* | 11/2006 | Kinoshita et al. | 725/118 |
| 2010/0194869 A1* | 8/2010 | Matsuzaki | 348/65 |
| 2010/0290667 A1* | 11/2010 | Lienhart et al. | 382/100 |

FOREIGN PATENT DOCUMENTS

| | | |
|---|---|---|
| JP | 04-328970 | 11/1992 |
| JP | 10-285460 | 10/1998 |
| JP | 2001-258011 | 9/2001 |
| JP | 2003-522498 | 7/2003 |
| JP | 2003-304504 | 10/2003 |
| KR | 10-2003-0078354 | 8/2002 |
| WO | 9828916 | 7/1998 |
| WO | 98-53611 | 11/1998 |
| WO | 0043899 | 7/2000 |
| WO | 01-61941 | 8/2001 |

OTHER PUBLICATIONS

European Search Report for EP application No. 08704625.
Japanese notice of Reasons for Rejection dated Jul. 20, 2012 for Japanese Patent Application No. 2009-544805, citing the above reference(s).

* cited by examiner

SYSTEM AND METHOD FOR SYNCHRONING BROADCAST CONTENT WITH SUPPLEMENTARY INFORMATION

CROSS REFERENCE TO RELATED APPLICATIONS

This application claims the priority of Korean Patent Application No. 10-2007-0002069, filed Jan. 8, 2007, and Korean Patent Application No. 10-2007-0087041, filed Aug. 29, 2007, in the KIPO (Korean Intellectual Property Office), the disclosures of which are incorporated herein in their entirety by reference. Further, this application is the National Phase application of International Application No. PCT/KR2008/000085, filed Jan. 8, 2008, which designates the United States and was published in English. Each of these applications is hereby incorporated by reference in their entirety into the present application.

TECHNICAL FIELD

The present invention relates generally to a system and method for synchronizing broadcast content with supplementary information and, more particularly, to a system and method for synchronizing broadcast content with supplementary information, which provides supplementary information based on broadcast content while temporally accurately matching the supplementary information to the corresponding broadcast content, which varies in real time.

BACKGROUND ART

Currently, mobile data communication services include a wireless Internet service, a mobile computing service, a wireless data communication service, a wireless Internet access service, and a satellite communication service.

Of the mobile data communication services, the field of a wireless broadcasting service for providing various types of content to personal information terminals has attracting the most attention in view of business diversity, marketability, and technological advancement. A data broadcasting service has recently been provided chiefly by Content Providers (CPs), broadcasting service providers and mobile communication service providers.

The existing data broadcasting service uses a method in which supplementary information (for example, a URL) for interfacing with a communication network is transferred over a broadcasting network and a user accesses the communication network using the supplementary information, or information to be displayed on a broadcast program is transferred over a communication network.

However, the method of transferring supplementary information over a broadcasting network has a problem in that additional broadcasting frequency resources must be used, has inefficiency in that information is transferred even when a viewer does not request supplementary information, and has limitation to service in that the same information is transferred to all users. Furthermore, the service for providing information, associated with broadcast, over a communication network has a problem in that it is practically difficult to temporally closely associate broadcast information with supplementary information, which is transferred over a communication network. As a result, the service does not provide supplementary information based on the details of a broadcast program while temporally matching it to the broadcast program, but uses only a limited method of providing pieces of information that are grouped for each program.

DISCLOSURE

Summary of the Invention

Technical Problem

Accordingly, the present invention has been made keeping in mind the above problems occurring in the prior art, and an object of the present invention is to provide a server and method for providing a supplementary information associated with a specific broadcast program on a broadcast content.

Technical Solution

To accomplish the above objects, according to an aspect of the present invention, there is provided a supplementary information server for providing a supplementary information associated with a specific broadcast program on a broadcast content, the supplementary information server comprising; a broadcasting receiving unit for receiving the broadcast content; a synchronization information unit for storing a synchronization information of the supplementary information associated with the specific broadcast program; a video comparison unit for comparing screens of the broadcast content with a previously stored scene change screen of the specific broadcast program and setting a start time of the specific broadcast program; a supplementary information extracting unit for calculating an elapsed time from the start time of the specific broadcast program to a specific screen and extracting the supplementary information corresponding to the elapsed time.

Preferably, the supplementary information extracting unit receives a time information of the specific screen from a user terminal, calculates the elapsed time based on the received time information of the specific screen and the start time of the specific broadcast program, extracts the supplementary information corresponding to the elapsed time, and transmits the supplementary information to the user terminal.

Preferably, the start time of the specific broadcast program and the time information of the specific screen includes at least one of PTS (Present Time Stamp) information, PCR (Program Clock Reference) information and frame number information.

Preferably, the supplementary information extracting unit further receives a coordinate information from the user terminal and extracts the supplementary information corresponding to the elapsed time and the coordinate information.

Preferably, the synchronization information of the supplementary information includes a time lag information of the scene change screen.

Preferably, the synchronization information of the supplementary information includes information of the scene change screen.

Preferably, the supplementary information server further comprises a unit for acquiring a start time information of the specific broadcast program from a program schedule information, and wherein the video comparing unit sets the start time of the specific broadcast program by supplementing the acquired start time information with the comparison.

To accomplish the above objects, according to an aspect of the present invention, there is provided a method for providing a supplementary information associated with a specific broadcast program on a broadcast content, the method comprising steps of; receiving a synchronization information of the supplementary information associated with the specific broadcast program; setting a start time of the specific broadcast program by comparing screens of the broadcast content with a previously stored scene change screen of the specific broadcast program; calculating an elapsed time corresponding to a specific screen based on the start time; extracting the supplementary information corresponding to the elapsed time.

Preferably, the method further comprises a step of receiving a time information of the specific screen from a user terminal, and the elapsed time is calculated based on the received time information of the specific screen and the start time of the specific broadcast program Preferably, the start time of the specific broadcast program and the time information of the specific screen includes at least one of PTS (Present Time Stamp) information, PCR (Program Clock Reference) information and frame number information.

Preferably, the method further comprises a step of receiving a coordinate information from the user terminal, and the supplementary information is extracted corresponding to the elapsed time and the coordinate information.

Preferably, the synchronization information of the supplementary information includes a time lag information of the scene change screen.

Preferably, the synchronization information of the supplementary information includes information of the scene change screen.

Preferably, the method further comprises a step of acquiring a start time information of the specific broadcast program from a programming schedule information included in the broadcast content; and the start time of specific broadcast program is set by supplementing the acquired start time information with the comparison.

Advantageous Effects

Since the system and method for synchronizing broadcast content and supplementary information according to the present invention can provide supplementary information based on broadcast content while temporally accurately matching the supplementary information to the corresponding broadcast content, which varies in real time, the degree of satisfaction of a user for the service can be increased.

Furthermore, since respective screens of a program broadcast by the broadcasting station are compared with a synchronization information screen provided by the supplementary information generating apparatus, there is an advantage in that the broadcast start time of a program can be easily detected and set.

Furthermore, since the broadcast start time of the program is detected, there is an advantage in that supplementary information associated with a program and a broadcasting time can be easily selected and searched. Moreover, since supplementary information associated with a program in a frame basis is searched for and provided, convenience can be improved.

DESCRIPTION OF DRAWINGS

The above and other objects, features and advantages of the present invention will be more clearly understood from the following detailed description taken in conjunction with the accompanying drawings, in which.

MODE FOR INVENTION

The present invention is now described in detail in connection with preferred embodiments with reference to the accompanying drawings.

A first embodiment of the present invention is described with reference to FIGS. 1 to 10.

Figure 1:
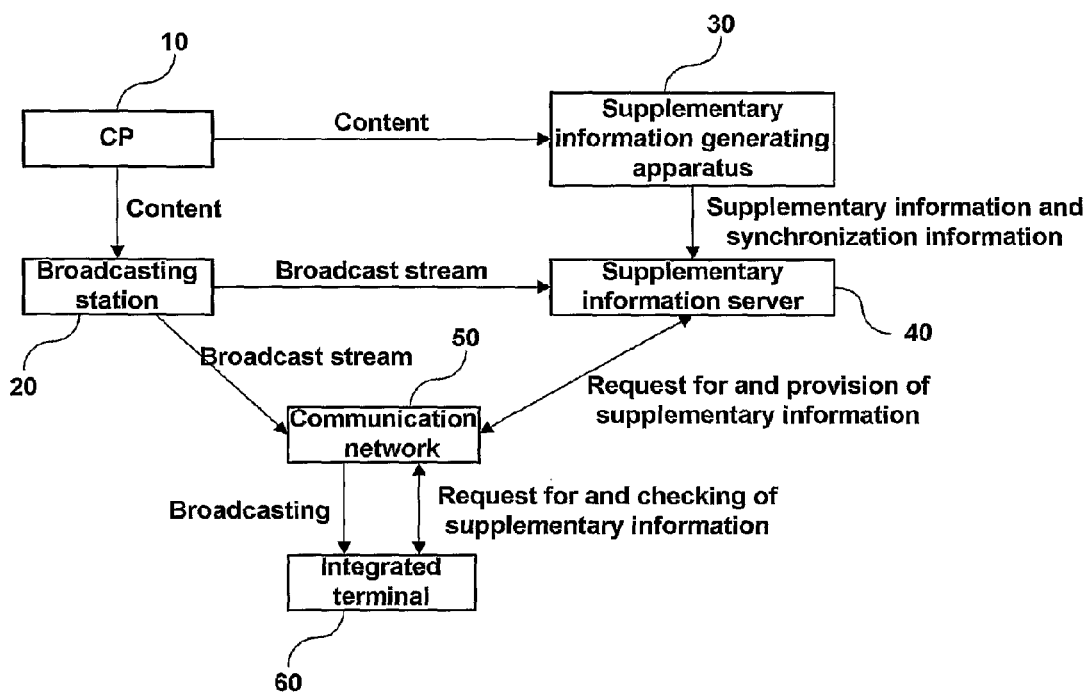
FIG. 1 is a configuration diagram of a system for synchronizing broadcast content with supplementary information according to a first embodiment of the present invention.
Figure 2:
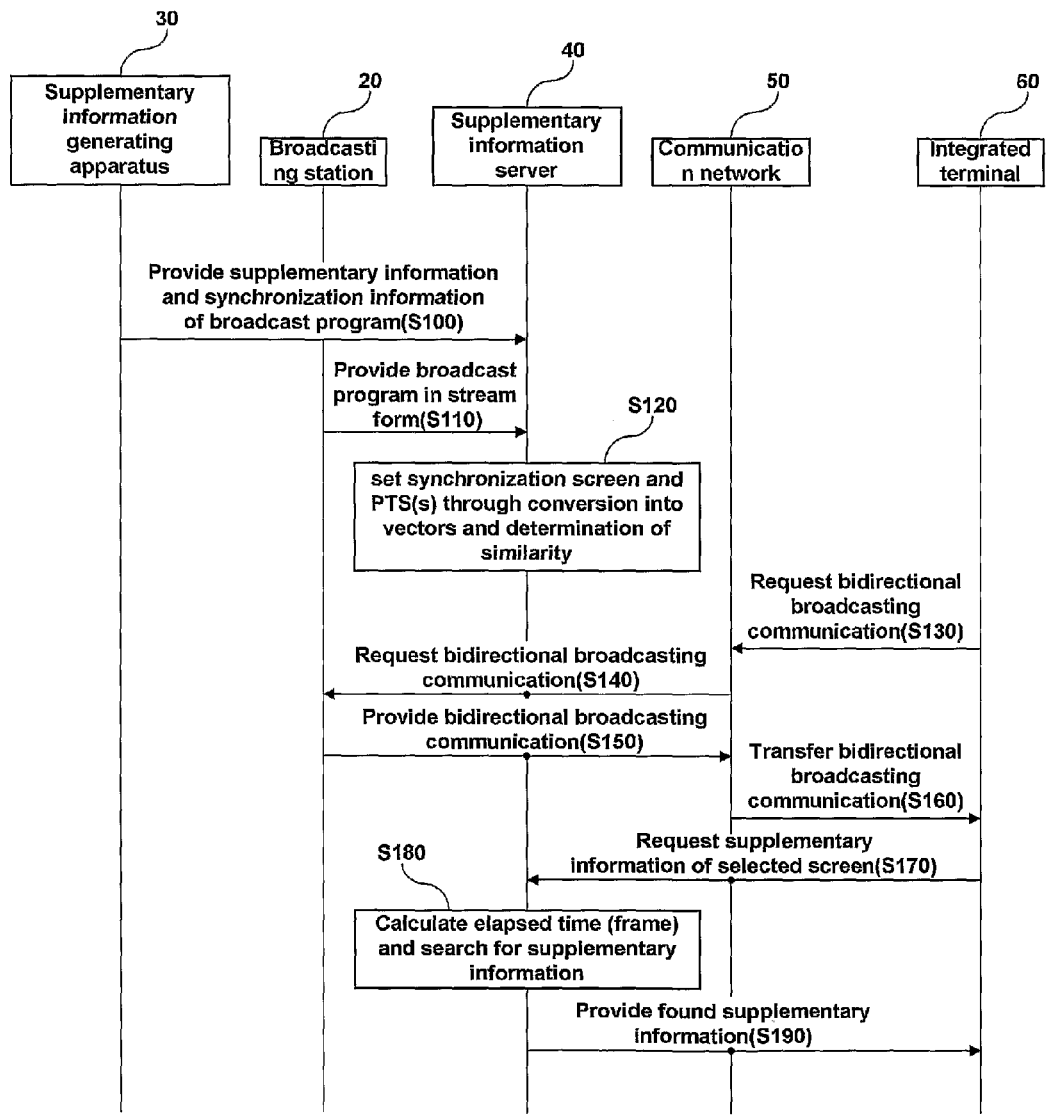
FIG. 2 is a signal flowchart showing a method of synchronizing broadcast content with supplementary information according to a first embodiment of the present invention.
Figure 3:
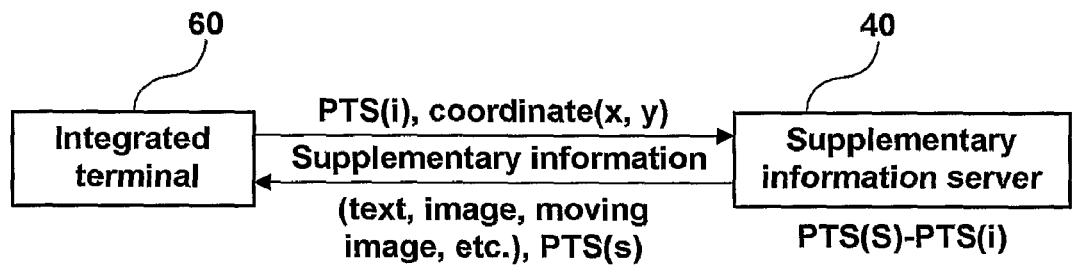
FIG. 3 is a conceptual view of the method of synchronizing broadcast content with supplementary information according to the first embodiment of the present invention.
Figure 4:
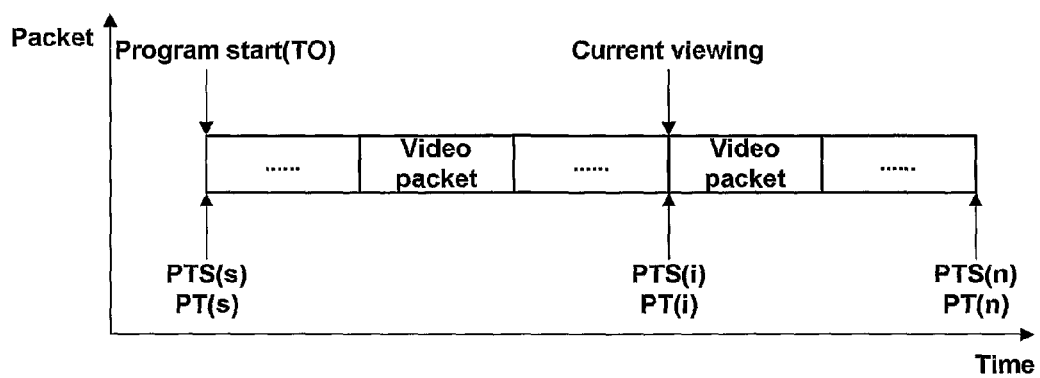
FIG. 4 is a view showing a program broadcast start time and the time at which a screen was selected while viewing.
Figure 5:
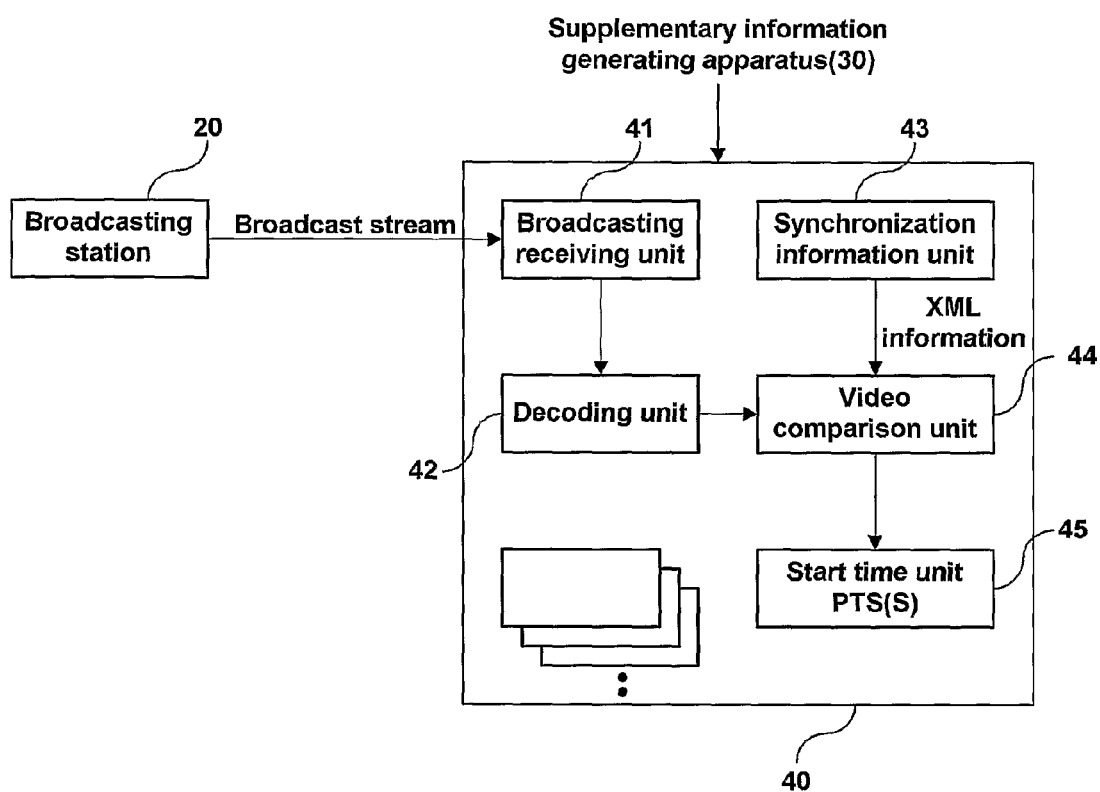
FIG. 5 is a configuration diagram of a supplementary information server according to a first embodiment of the present invention.
Figure 6:
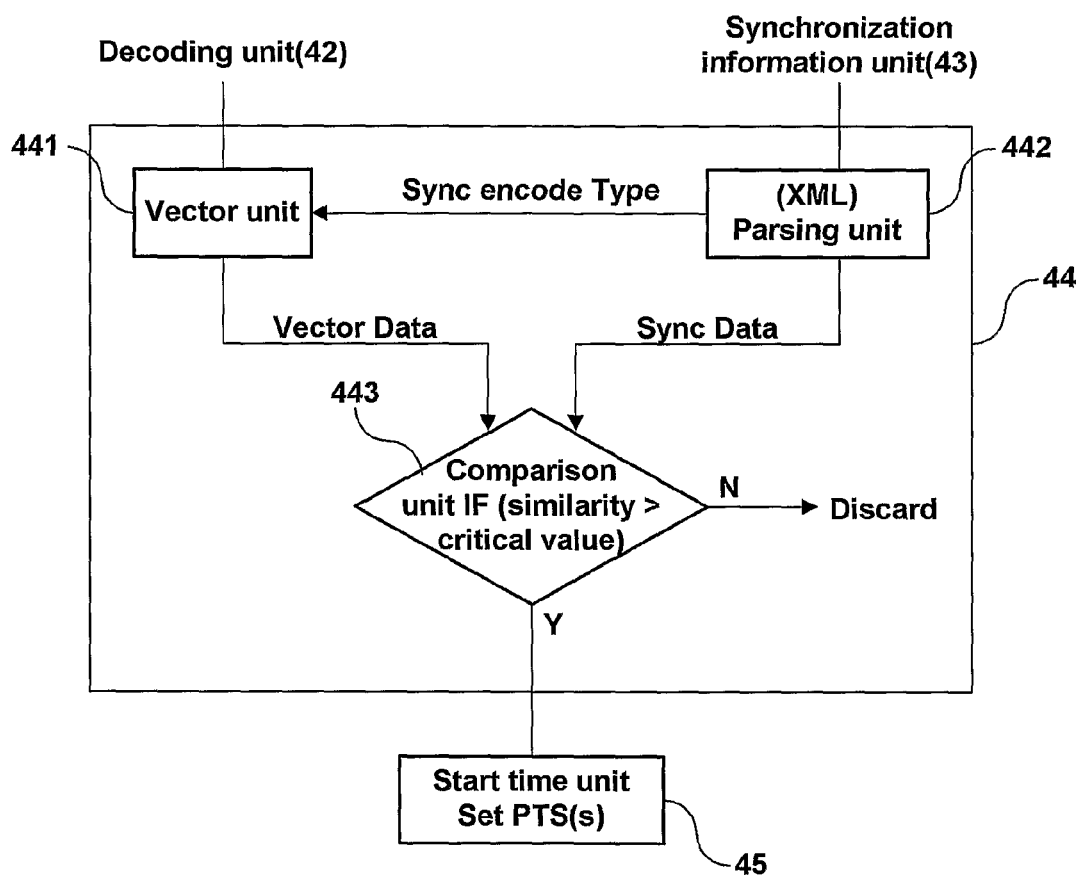
FIG. 6 is a detailed configuration diagram of the video comparison unit of FIG. 5.
Figure 7:
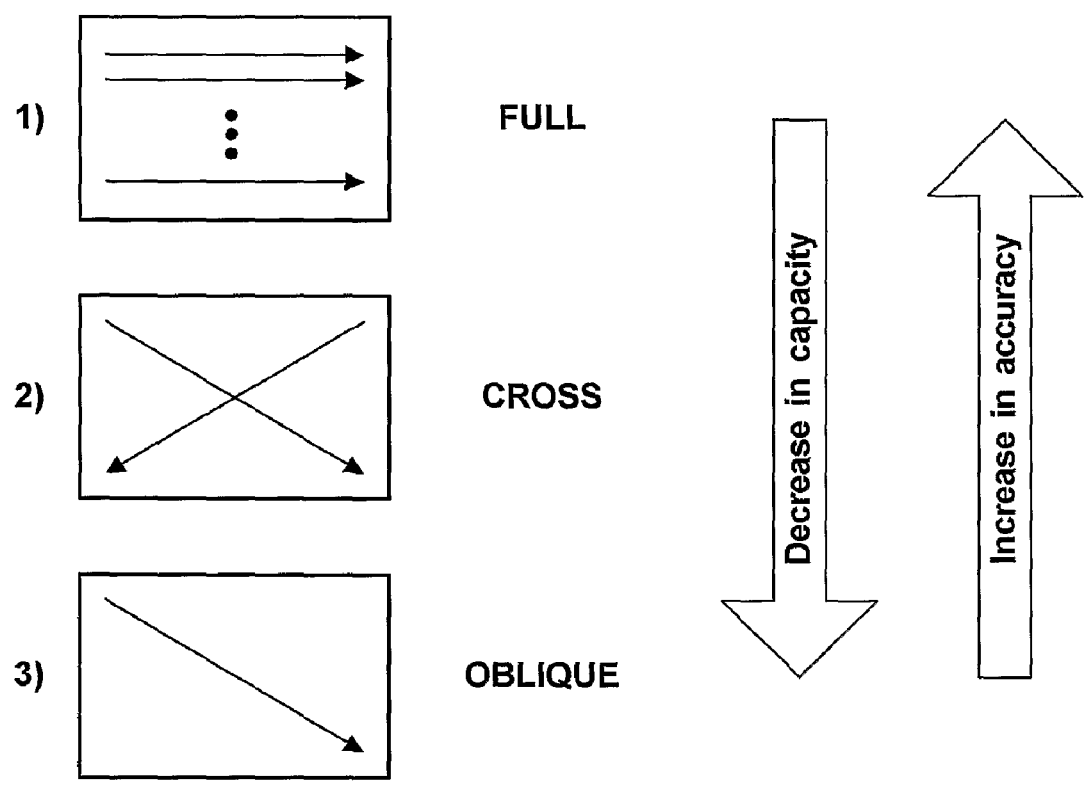
FIG. 7 is a conceptual view showing a method of converting screen information into vectors.
Figure 8:
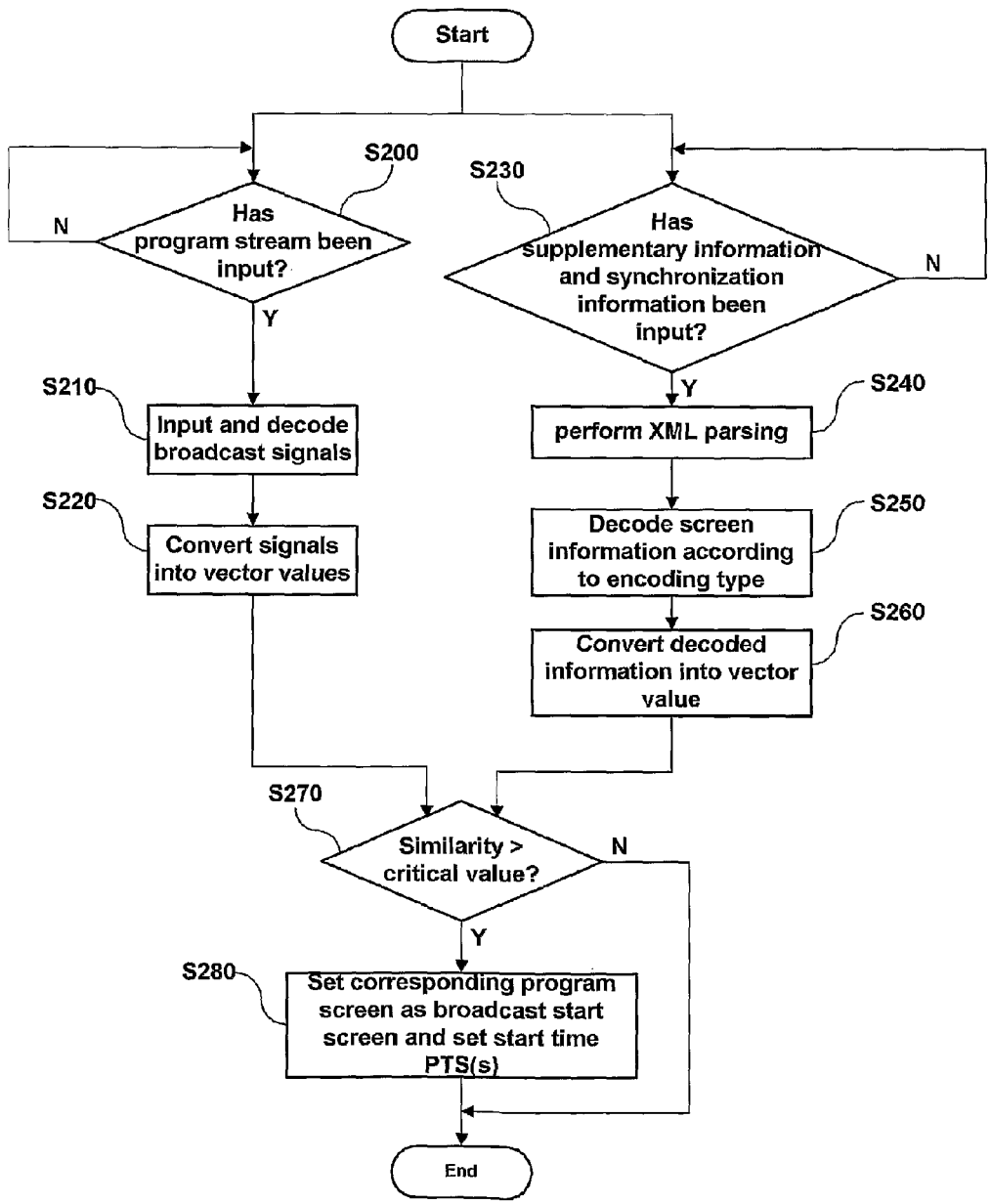
FIG. 8 is a flowchart showing an example of the operation of the supplementary information server according to the first embodiment of the present invention.
Figure 9:
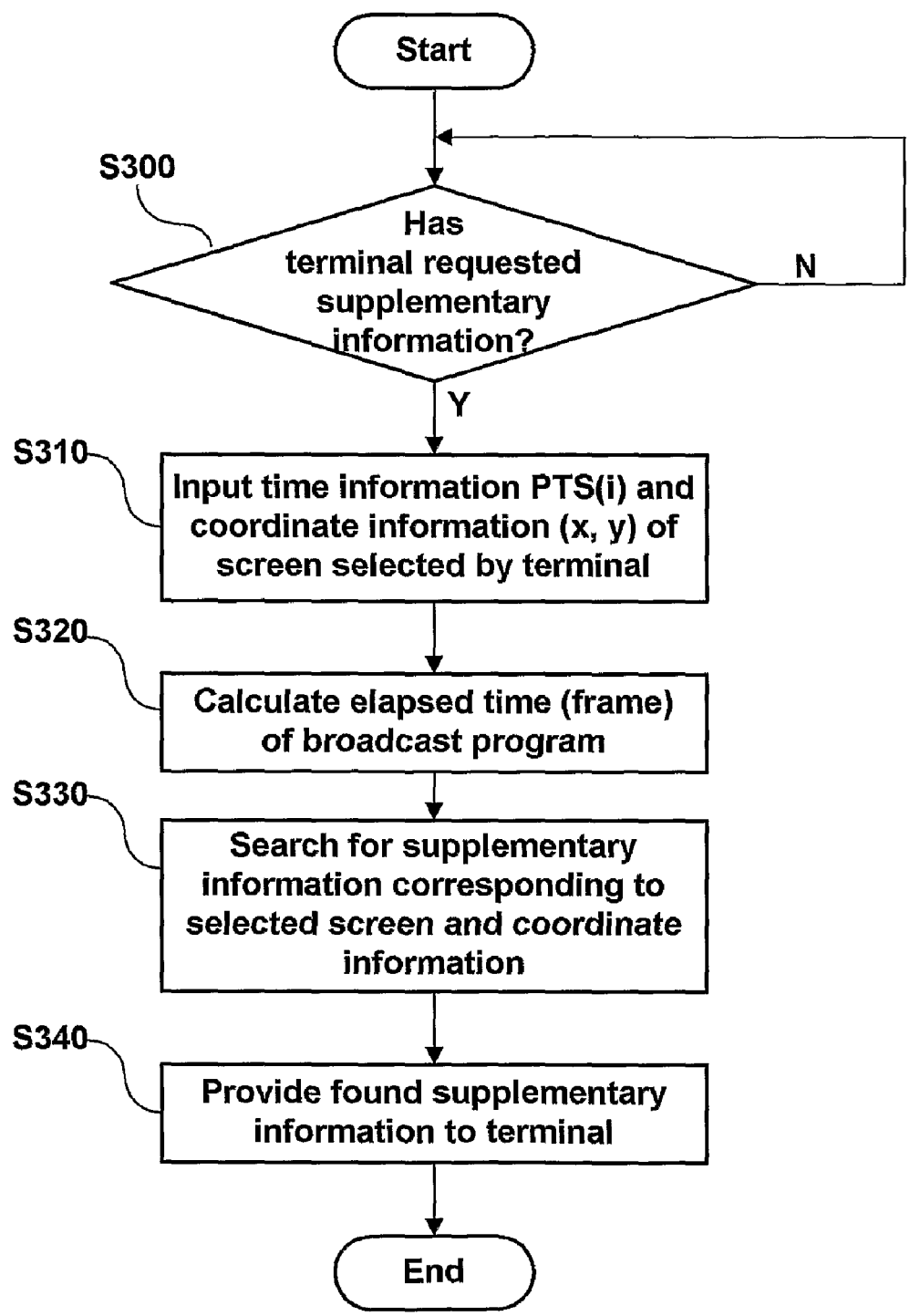
FIG. 9 is a flowchart showing another example of the operation of the supplementary information server according to the first embodiment of the present invention.
Figure 10:
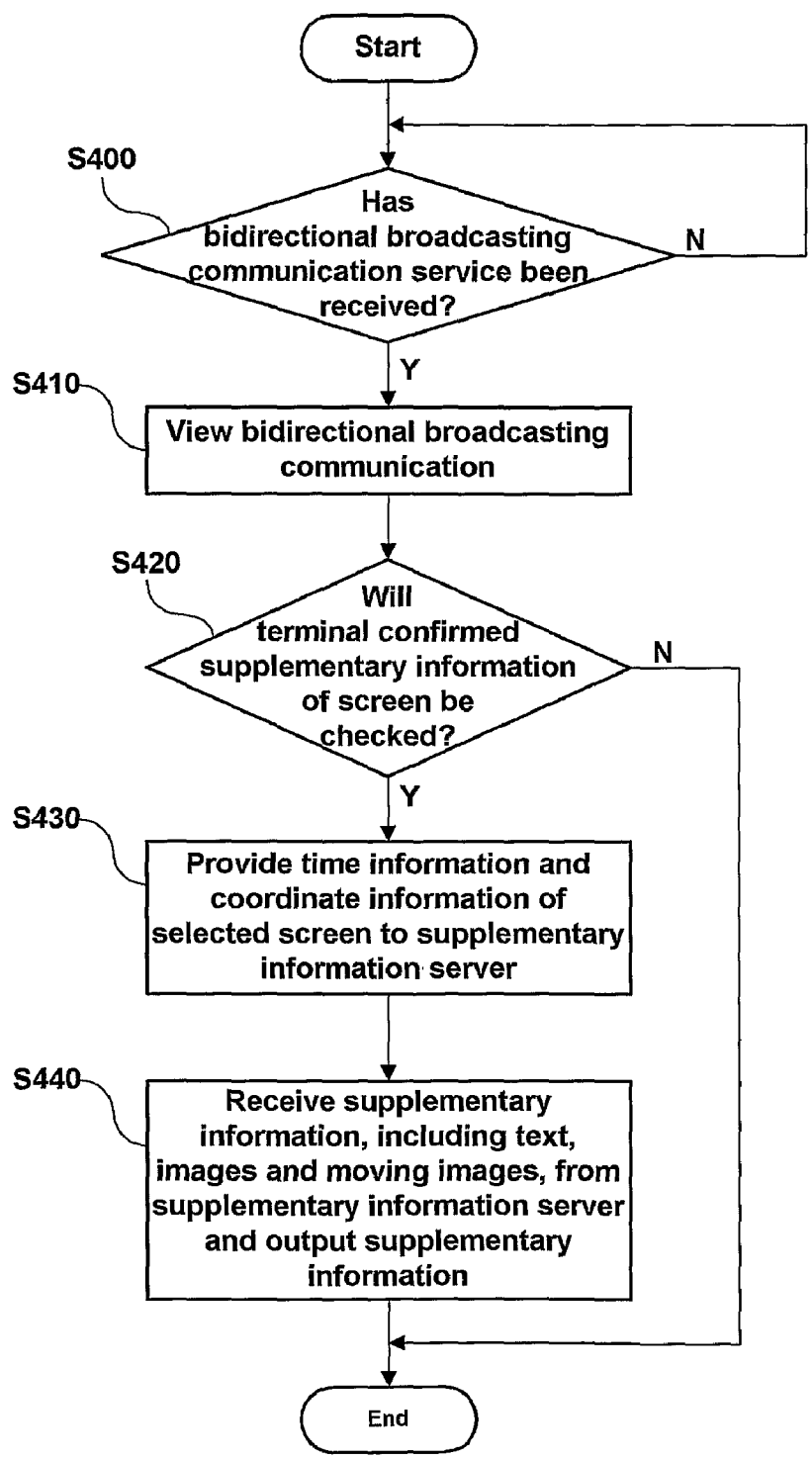
FIG. 10 is a flowchart showing the operation of an integrated terminal according to the first embodiment of the present invention.

FIG. 1 is a configuration diagram of a system for synchronizing broadcast content with supplementary information according to a first embodiment of the present invention. FIG. 2 is a signal flowchart showing a method of synchronizing broadcast content with supplementary information according to a first embodiment of the present invention. FIG. 3 is a conceptual view of the method of synchronizing broadcast content with supplementary information according to the first embodiment of the present invention. FIG. 4 is a view showing a program broadcast start time and the time at which a screen is selected while viewing. FIG. 5 is a configuration diagram of a supplementary information server according to a first embodiment of the present invention. FIG. 6 is a detailed configuration diagram of the video comparison unit of FIG. 5. FIG. 7 is a conceptual view showing a method of converting screen information into vectors. FIG. 8 is a flowchart showing an example of the operation of the supplementary information server according to the first embodiment of the present invention. FIG. 9 is a flowchart showing another example of the operation of the supplementary information server according to the first embodiment of the present invention. FIG. 10 is a flowchart showing the operation of an integrated terminal according to the first embodiment of the present invention;

Referring to FIG. 1, the synchronization system according to the first embodiment of the present invention includes a CP 10 for producing and supplying multimedia a content program to be broadcast; a broadcasting station 20 for broadcasting a program, which is received from the CP or produced by itself, via terrestrial waves or providing the program to a specific wired path in stream form; a supplementary information generating apparatus 30 for producing and supplying supplementary information necessary for each screen of program content and the synchronization information of a screen for the start of the program; a supplementary information server 40 for receiving the program, broadcast in stream form by the broadcasting station, and the supplementary information and synchronization information, supplied by the supplementary information generating apparatus, detecting the start time point and start time of a broadcast through screen comparison, and providing selected supplementary information; a communication network 50 for broadcasting the program, broadcast in stream form by the broadcasting station, to a plurality of integrated terminals and providing the supplementary information, supplied by the supplementary information server, to a specific integrated terminal through communication; and an integrated terminal 60 for connecting with the communication network in a communication state, viewing the broadcast program, and requesting and checking the supplementary information of a selected screen.

Referring to FIG. 2, the synchronization method of the present invention includes the step of receiving a program from the broadcasting station in stream form, receiving supplementary information for each screen of the program and synchronization information from the supplementary information generating apparatus in eXtensible Markup Language (XML) format, the step of comparing the vector values of screens and then setting a corresponding screen as a synchronization screen and setting a program start time if the similarity between the vector values is greater than a critical value; the step of, when the integrated terminal requests a bidirectional broadcasting communication service, receiving a bidirectional broadcasting communication program from the broadcasting station and the supplementary information server over a communication network and providing the received bidirectional broadcasting communication program to the integrated terminal; and the step of, when the integrated terminal requests supplementary information of a selected screen, calculating the time elapsed from the start time of a program, searching for the supplementary information, and providing the supplementary information to the integrated terminal, using the supplementary information server.

The synchronization system and method of the present invention are described in more detail below with reference to FIGS. 1 and 2.

The CP 10 produces programs having various types of content, which are composed of music, messages, text, images, and moving images, and supplies the programs to the broadcasting station 20 and the supplementary information generating apparatus 30.

The broadcasting station 20 broadcasts a selected program via terrestrial waves and a designated wired line at the planned and designated time.

The supplementary information generating apparatus 30 checks the time, at which the program is broadcast, through consultation with the broadcasting station or the CP in advance, produces various pieces of supplementary information for corresponding content, and produces synchronization information related to the start of the program.

The supplementary information, in an embodiment, may include the personal information of a player or a singer appearing on each screen of a program, and information about the costume or accessory of the player or singer, a related association of like-minded persons, a subsequent appearance, a public performance schedule, a contact address, a shop, a price, a quantity, etc., and may be used in various ways based on preference.

Since the supplementary information is produced such that it corresponds to each corresponding screen of a program, it must be provided through the accurate detection of the location of a designated screen and a search for the corresponding supplementary information after the program is broadcast.

The present invention is configured to match a program with supplementary information as described above, and relates to a technology for accurately detecting the time at which the program is broadcast, accurately detecting the time of a screen selected by a viewer, and searching for and providing corresponding supplementary information.

In this case, each screen and a selected screen of a program can be detected based on the time or frame, which is selected by a system operator.

The supplementary information server 40 receives the screen-based supplementary information of a program and information about a synchronization screen from the supplementary information generating apparatus, and also receives a program, broadcast by the broadcasting station, through a wired line in stream form.

The supplementary information server 40 detects synchronization information by performing XML parsing on the supplementary information and the synchronization information provided by the supplementary information generating apparatus 30 in XML format, and converts a screen, decoded according to the encode type of the detected synchronization information, into vector values.

The supplementary information, supplied by the supplementary information generating apparatus 30 to the supplementary information server 40, may have the following type of XML information.

```
<INFO>
<SYNC encode Type="full" data="V1,V2,V3,...,VN"/>
<PPL id="1" beginTime="20s" url="http://...aaa..."/>
<PPL id="2" beginTime="60s" url="http://...bbb..."/>
</INFO>
```

The SYNC tag refers to synchronization information, and the PPL tag refers to the URL of supplementary information.

The supplementary information server 40 decodes a broadcast program, provided by the broadcasting station 20 in stream form, for respective screens, and converts the broadcast program into vector values.

The supplementary information server 40 detects the time at which a broadcast started by evaluating the similarity between each screen of the broadcast program, converted into a vector value as described above, and synchronization information.

In the evaluation of similarity, a method, such as a Euclidean distance method or a cosine distance method, is used as a method that is used to measure the distance between vectors.

The time (a Present Time Stamp (Start) (a PTS) at which a broadcast started is detected using this method, recorded and managed, and corresponding supplementary information is also recorded and managed in association with the time.

The corresponding supplementary information may be recorded and managed in association with the frame number sequence of a screen, instead in association with the time PTS, according to selection.

The communication network 50 receives a program, broadcast by the broadcasting station 20, in stream form, and broadcasts the program to a plurality of the integrated terminals 60, which desire to use a bidirectional broadcasting communication service, via a designed wireless channel.

In this case, the communication network 50 provides the supplementary information server 40 with information about the integrated terminal 60 that uses the bidirectional broadcasting communication service.

When a user selects a specific screen using a touch screen while viewing a broadcast program, the integrated terminal 60 checks corresponding time information PTS(i) and coordinate information (x, y) and provides the information to the supplementary information server 40 over the communication network 50. At this time, the supplementary information server 40 is also provided with information about a channel and information about a program (event information), which are being viewed.

The supplementary information server 40 calculates the start time PTS at which the program started to be broadcast and the time PTS(i) of the screen selected by the integrated terminal, and searches for supplementary information corresponding to the calculated time. Meanwhile, when PTS information is used, the supplementary information server 40 also uses general time information (for example, 12:30:9:05), which is synchronized with that of respective servers or devices within the communication network, together with the PTS information. This is the same for all servers or devices using PTS information, and is applied to the following description in the same manner.

The found information is searched for information corresponding to coordinate information again, and this found information is transferred to a corresponding integrated terminal 60 over the communication network using a communication method.

The supplementary information includes text, images, moving images, a URL address and so on. From FIG. 3, a signal flow between the integrated terminal 60 and the supplementary information server 40 can be seen.

The integrated terminal 60 provides information about the time PTS(i) at which a screen, for which supplementary information will be checked, is selected, coordinate information (x,y), broadcasting channel information and program information (event information), and receives and checks text, images, moving images, an URL address, etc., which are the corresponding supplementary information. When providing the supplementary information, the supplementary information server 40 also provides PTS(s) information.

FIG. 4 shows the relationship between time information and a broadcast program in order to search for and provide supplementary information.

A program includes a start time T0 and an end time PTS(n). The supplementary information server 40 searches the start time and sets it as a broadcast start time PTS(s). A program, including a plurality of screens, is broadcast in a video packet basis. The time PTS(i) at which the integrated terminal 60 selected a specific screen in order to check supplementary information is displayed as a current viewing time.

The supplementary information server 40 may classify, record and manage the supplementary information associated with the broadcast program in a time basis or in a frame basis.

When the supplementary information associated with the program is classified, recorded and managed in a frame basis, the term "frame" must be used instead of the term "time" in the above description.

Therefore, the integrated terminal 60 connects with the communication network, and receives and views a program broadcast by the broadcasting station using a broadcasting method. With regard to the supplementary information of a selected screen, the integrated terminal 60 receives supplementary information, found based on the time or frame information, from the supplementary information server 40, which is connected using a communication method. This signal flow is described in detail below with reference to FIG. 2. The supplementary information server 40 receives the supplementary information of a broadcast program and synchronization information in XML format from the supplementary information generating apparatus 30 at step S100, and receives a program, broadcast by the broadcasting station 20, in stream form at step S110.

The supplementary information server 40 parses, separates, decodes and vector-converts the synchronization information received from the supplementary information generating apparatus 30, decodes and vector-converts the program received from the broadcasting station 20 in a screen basis, searches for a synchronization screen, and sets, records and manages a broadcast start time PTS(s) at step S120.

When a signal requesting a bidirectional broadcasting communication service is received from the integrated terminal 60 at step S130, the communication network 50 informs the supplementary information server 40 of information about the integrated terminal 60 and, at the same time, requests the broadcasting station 20 to provide a broadcast program at step S140. The communication network 50 receives the program broadcast by the broadcasting station 20 at step S150, and broadcasts the program by transferring the program to the integrated terminal 60 via a designated one of the wireless channels allocated using a mobile communication method at step S160.

As described above, the integrated terminal 60 that views the program via bidirectional broadcasting communication requests the supplementary information of a selected screen from the supplementary information server 40 over the communication network 50 at step S170.

The supplementary information server 40 detects the corresponding time information PTS(i) of a screen, for which supplementary information is requested by the integrated terminal 60, detects the time, elapsed after the program was broadcast, through calculation using the start time information PTS(s) that is recorded and managed, and searches for supplementary information corresponding to the elapsed time calculated as described above at step S180.

In this case, when coordinate information (x,y) is necessary, the supplementary information server 40 can search for the supplementary information, including the coordinate information. The supplementary information includes text, images, moving images, URL address information and so on.

The supplementary information found by the supplementary information server 40 is provided to the integrated terminal 60 over the communication network at step S190.

Accordingly, broadcast start screen and time are detected and set by comparing the vector values of the screens of a program, broadcast by the broadcasting station 20, and the vector value of a synchronization information screen, provided by the supplementary information generating apparatus 30.

With reference to FIG. 5, the supplementary information server according to an embodiment of the present invention is described below. The supplementary information server 40 may include a broadcasting receiving unit 41 for receiving a program broadcast by the broadcasting station in stream form; a decoding unit 42 for decoding the program, received by the broadcasting receiving unit, into screen-based video information; a synchronization information unit 43 for recording and managing supplementary information and synchronization information provided by the supplementary information generating apparatus 30 in XML format; a video comparison unit 44 for receiving synchronization screen information in XML format from the synchronization information unit, receiving screen-based program information from the decoding unit, performing vector conversion on the information, evaluating similarity, and when the similarity is greater than a specific critical value, setting the screen as a broadcast start screen and at the same time detecting a broadcast start time PTS(s); and a start time unit 45 for recording and managing the start time PTS(s) provided by the video comparison unit.

With reference to FIG. 6, the video comparison unit 44 is described in more detail. The video comparison unit 44 may include a vector unit 441 for converting screen-based information signals, received from the decoding unit 42, and the information of a synchronization screen, received from a parsing unit 442, into screen information signals decoded according to the encoding type, a parsing unit 442 for parsing supplementary information and synchronization information, provided by the synchronization information unit 43 in XML format, separating the synchronization information, decoding the synchronization information according to the encoding type, and providing the synchronization information converted into a vector value, and a comparison unit 443 for determining whether the vector information similarity between respective screens, provided by the vector unit and the parsing unit, is greater than a specific critical value, discarding screens having lower values, and selecting a screen having a higher value, and setting corresponding time as a start time.

Referring to FIG. 8, a method of operating the supplementary information server of the present invention may include the step of receiving a program from the broadcasting station in stream form, decoding the program, and converting the program into vector values; the step of receiving supplementary information and synchronization information from the supplementary information generating apparatus by the supplementary information server, performing XML parsing on the information, decoding the parsed information according to the encoding type, and converting the decoded information into a vector value; and the step of evaluating the similarity between vector values, and setting the synchronization screen and start time of the program if the similarity between vector values is greater than a critical value.

With reference to FIGS. 5 and 6, the supplementary information server of the present invention and the operation thereof are described in detail below.

The broadcasting station 20 broadcasts a program via a corresponding frequency in a wireless manner and, at the same time, broadcasts the program to the supplementary information server 40 in stream form via a designated wired line.

The broadcasting receiving unit 41 of the supplementary information server 40 receives the program broadcast in stream form and provides the received program to the decoding unit 42. The decoding unit 42 decodes the program into screen-based video data signals and provides the decoded signals to the video comparison unit 44.

Furthermore, the synchronization information unit 43 receives and records the supplementary information and synchronization information of the program provided by the supplementary information generating apparatus 30 in XML format, and then provides the supplementary information and the synchronization information to the video comparison unit 44.

The vector unit 441 of the video comparison unit 44 receives the screen-based video signals from the decoding unit 42 and converts the signals into vector values.

Furthermore, the parsing unit 442 parses the information in XML format, received from the synchronization information unit 43, separates the data information of a synchronization screen, decodes the separated data information according to the encoding type of the separated synchronization screen information, and provides the decoded information to the vector unit 441. The vector unit 441 converts each screen into a vector value and provides the converted vector value to the comparison unit 443.

Referring to FIG. 7, a method in which the vector unit 441 obtains the vector value of each screen includes a FULL method, a CROSS method and an OBLIQUE method. The FULL method is the most accurate one, but requires a great amount of data and a long time. The OBLIQUE method requires a small amount of data and a short time, but has low accuracy.

These vector characteristics vary according to the processing time, memory space, accuracy, etc. Therefore, an adequate method is selected based on a corresponding application.

The broadcast program and the synchronization video information, which have been converted into the vector values by the vector unit 441, are provided to the comparison unit 443. The comparison unit 443 determines whether the similarity between the vector values is greater than a set critical value, discards program screens having similarity smaller than the critical value, selects a program screen having similarity greater than the critical value, sets the selected program screen as the broadcast start screen, and sets the broadcast start time PTS(s).

The method in which the comparison unit 443 measures the similarity is a method of measuring the distance between vectors, which includes an Euclidean distance method and a cosine distance method.

Information about the start time PTS(s), set by the video comparison unit 44, including the vector unit 441, the parsing unit 442 and the comparison unit 443, is provided to and recorded and managed by the start time unit 45.

With reference to FIG. 8, this process is described in more detail below.

The supplementary information server 40 determines whether a broadcast program is being provided by the broadcasting station 20 in stream form at step S200.

If, as a result of the determination, it is determined that the broadcast program is being provided in stream form, the broadcasting receiving unit 41 receives the broadcast program and provides the broadcast program to the decoding unit 42. The decoding unit 42 performs a decoding process of demodulating the broadcast program into screen-based video signals or screen signals at step S210.

The screen-based signals of the demodulated program are provided to the video comparison unit 44 and are converted into screen-based vector values at step S220.

Further, the supplementary information server 40 determines whether supplementary information and synchronization information are provided in XML format from the supplementary information generating apparatus 30 at step S230. If, as a result of the determination, it is determined that the supplementary information and the synchronization information are provided in XML format, the synchronization information unit 43 receives the supplementary information and the synchronization information and provides them to the video comparison unit 44.

The parsing unit 442 of the video comparison unit 44 parses the information in XML format and separates the information of a synchronization screen at step S240, and decodes the information of the separated synchronization screen according to the encoding type at step S250. The vector unit 441 converts the decoded information into a vector value at step S260.

The comparison unit 443 determines whether the similarity is greater than a specific critical value by evaluating the similarity between the vector values of the program and the vector value of the synchronization screen information as described above at step S270.

If, as a result of the evaluation, it is determined that the similarity between the vector value of a program screen and the vector value of the synchronization screen information is greater than the specific critical value, the corresponding program screen is set as a broadcast start screen and the time at which the set screen was broadcast is set as the broadcast start time PTS(s) of the program at step S280.

Therefore, the broadcast start time is detected and set by comparing the screens of the program, broadcast by the broadcasting station 20, with the synchronization information screen, provided by the supplementary information generating apparatus 30.

Referring to FIG. 9, the operation process of the supplementary information server according to another example of the present invention is performed by the supplementary information server 40, and includes the step of determining whether the integrated terminal 60 has requested the supplementary information of a selected screen; the step of receiving the time information and coordinate information of the selected screen from the integrated terminal and calculating the broadcast elapsed time of a program; and the step of searching for supplementary information corresponding to the selected screen and the coordinate information and providing the supplementary information to the integrated terminal.

More specifically, the supplementary information server 40 determines whether the integrated terminal 60 has requested supplementary information at step S300. When the user of the integrated terminal 60 selects a screen while viewing a broadcast program and requests the supply of supplementary information, the supplementary information server 40 receives channel information for identifying a channel that is being viewed, event information for identifying a program that is being viewed, and time information PTS(i) and coordinate information (x,y) of the screen, selected by the user, from the integrated terminal 60 at step S310.

The supplementary information server 40 detects the time, elapsed after the program started to be broadcast, by calculating the broadcast start time PTS(s) of a broadcast start screen, already detected and set, and the time information PTS(i) of the requested screen, provided by the integrated terminal 60, at step S320.

The supplementary information server 40 searches for supplementary information with reference to the calculated time value and the coordinate value at step S330, and provides the corresponding supplementary information (text, images, moving images, etc.) and the PTS(s) information to the integrated terminal 60 at step S340.

Referring to FIG. 10, the operation process of the integrated terminal according to an embodiment of the present invention may include the step of determining whether the integrated terminal 60 receives a broadcasting communication signal; the step of, if, as a result of the determination, it is determined that the integrated terminal 60 receives the broadcasting communication signal, determining whether the integrated terminal 60 will receive and view a program and check supplementary information; and the step of, if, as a result of the determination, it is determined that the integrated terminal 60 will check supplementary information, providing the time information and coordinate information of a screen to the integrated terminal 60 and receiving and outputting supplementary information, including text, images, audio, moving images and an URL.

More specifically, the integrated terminal 60 connects with the communication network 50 in a communication state, and determines whether it will receive and view a program, broadcast by the broadcasting station 20, through a bidirectional broadcasting communication service at step S400.

If, as a result of the determination, it is determined that the integrated terminal 60 will receive bidirectional broadcasting communication, the integrated terminal 60 receives and views the program broadcast via a designated wireless mobile communication channel at step S410. Thereafter, it is determined whether the integrated terminal 60 will designate a specific screen and receive corresponding supplementary information while viewing the program at step S420. If, as a result of the determination, it is determined that the integrated terminal 60 will designate a specific screen and receive corresponding supplementary information, the integrated terminal 60 provides the corresponding time information PTS(i) and coordinate information (x,y) of the designated screen to the supplementary information server 40 over the communication network 50 at step S430.

The integrated terminal 60 receives supplementary information, including text, images, audio, moving images and URL information, from the supplementary information server 40, and outputs the supplementary information through a corresponding display unit and/or an audio unit at step S440.

With reference to FIGS. 11 to 13A, a second embodiment of the present invention is described below.

Figure 11:
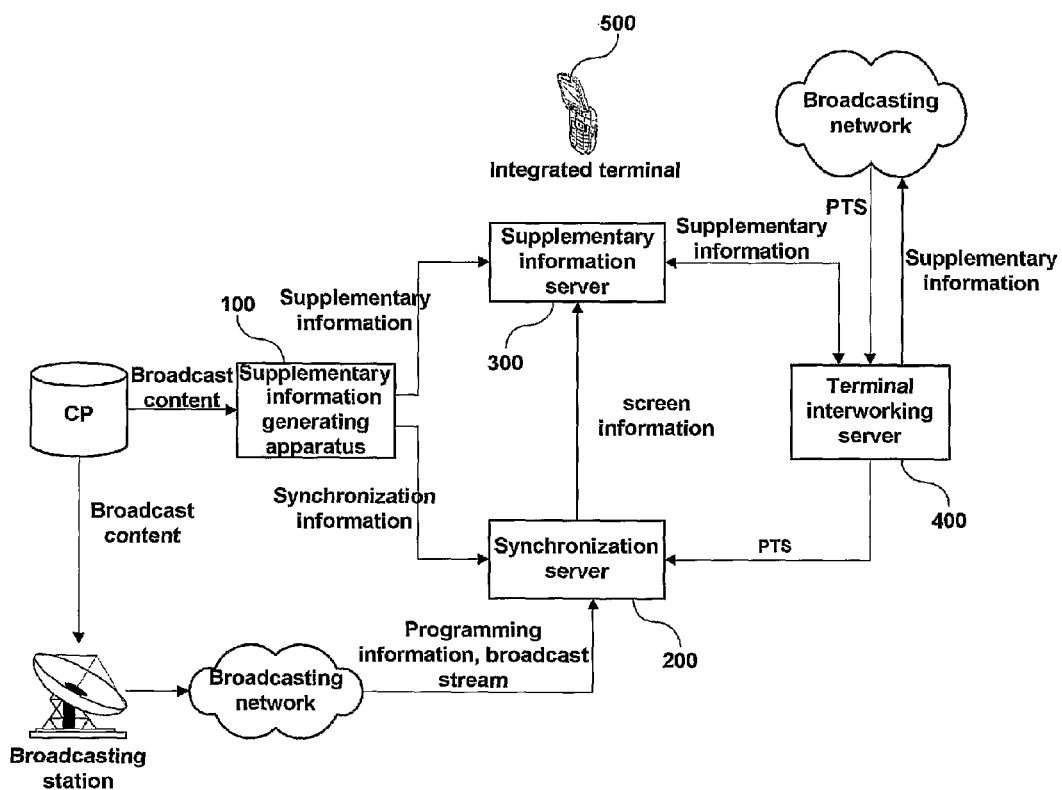
FIG. 11 is a schematic configuration diagram of a system for synchronizing broadcast content with supplementary information according to the second embodiment of the present invention.

FIG. 11 is a schematic configuration diagram of a system for synchronizing broadcast content with supplementary information according to the second embodiment of the present invention.

As shown in FIG. 11, the system according to the second embodiment of the present invention includes a supplementary information generating apparatus 100, a synchronization server 200, a supplementary information server 300, a terminal interworking server 400, and an integrated terminal 500.

The supplementary information generating apparatus 100 receives broadcast content, identical to broadcast content transmitted over a broadcasting network, from a CP, and generates and transmits supplementary information and synchronization information associated with the broadcast content. Preferably, the supplementary information generating apparatus 100 generates supplementary information, including, for example, the story information, character information and background music information of a specific program, information about products appearing in the program, and so on, and transmits the supplementary information to the supplementary information server 300. Furthermore, the supplementary information generating apparatus 100 generates synchronization information, such as the initial screen of a specific broadcast program, the scene change screen of the specific broadcast program, information about the time at which a scene was changed after the corresponding program had started, information about the time lag between the scene change screen and the initial screen of the specific program, and information about the characteristic value of the initial screen or the scene change screen, and transmits the synchronization information to the synchronization server 200.

The synchronization server 200 detects synchronization information, in which the time offset between the broadcast content, provided by the CP, and the broadcast content, received over the broadcasting network, is considered, by comparing the broadcast content, received over the broadcasting network, with the synchronization information, received from the supplementary information generating apparatus 100, and extracts screen information corresponding to the time at which the supplementary information was requested by the integrated terminal 500 based on the detected synchronization information.

Figure 12:
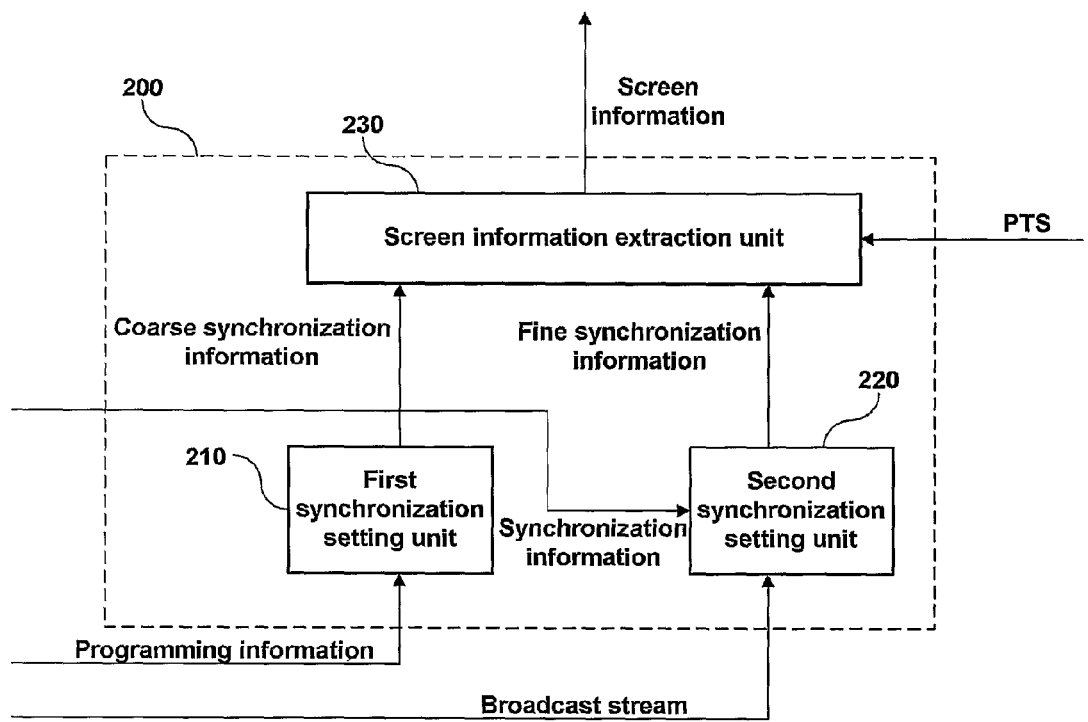
FIG. 12 is a schematic configuration diagram of a synchronization server according to a second embodiment of the present invention.

For this purpose, the synchronization server 200, as shown in FIG. 12, includes a first synchronization setting unit 210 for acquiring coarse synchronization information having an offset of several seconds with respect to the start time of a specific program; a second synchronization setting unit 220 for supplementing the coarse synchronization information; and a screen information extraction unit 230 for extracting screen information corresponding to the time at which the supplementary information was requested by the integrated terminal 500 based on the synchronization information acquired through the first synchronization setting unit 210 and the second synchronization setting unit 220.

The first synchronization setting unit 210 acquires the coarse synchronization information, including information about the start time of a specific program on the broadcast content received from the CP, based on programming information transferred via the Electronic Program Guide (EPG) channel of the broadcasting network. Alternatively, the first synchronization setting unit 210 may receive programming information from a Program Management Sever (PMS), which is included in the broadcasting station besides the EPG channel, in order to obtain the coarse synchronization information.

The second synchronization setting unit 220 extracts information about a scene change screen of a specific program on the broadcast content, received over the broadcasting network, based on information about a scene change screen received from the supplementary information generating apparatus 100. Furthermore, the second synchronization setting unit 220 acquires information about the initial screen of the specific program on the broadcast content, received over the broadcasting network, based on information about the time lag between the scene change screen and the initial screen of the specific program, and extracts fine synchronization information, including PTS information encoded in the initial screen information. Here, the PTS information refers to current time information based on a screen in the MPEG 2-standard. Program Clock Reference (PCR) may also be used instead of the PTS information.

The screen information extraction unit 230 extracts screen information, corresponding to the time at which the supplementary information was requested, using the time lag with respect to the PTS information, which is received in response to the request for the supplementary information from the integrated terminal, based on the coarse synchronization information and the fine synchronization information, and transmits the extracted screen information to the supplementary information server 300.

The supplementary information server 300 receives and stores the supplementary information from the supplementary information generating apparatus 100, receives the extracted screen information from the synchronization server 200, preferably from the screen information extraction unit 230, in response to the request for the supplementary information, extracts supplementary information, associated with the screen information from the received supplementary information, and transmits the extracted supplementary information.

The terminal interworking server 400 is configured to prevent the integrated terminal 500 from attempting to access the synchronization server 200 and the supplementary information server 300 separately and to enable the integrated terminal 500 to use an interworking service through a single server. The terminal interworking server 400 provides the PTS information of broadcast content, corresponding to the time at which the supplementary information was requested and received in response to the request for the supplementary information from the integrated terminal 500 over the communication network, to the synchronization server 200, receives specific supplementary information extracted from the supplementary information server 300, and provides the received specific supplementary information to the integrated terminal 500.

The integrated terminal 500 refers to one of the various terminals, including a mobile communication terminal configured to implement a broadcasting service and a communication service at the same time, and displays broadcast content, received over the broadcasting network, and supplementary information, synchronized with the broadcast content received from the terminal interworking server 400 over the communication network in response to a request.

Figure 13:
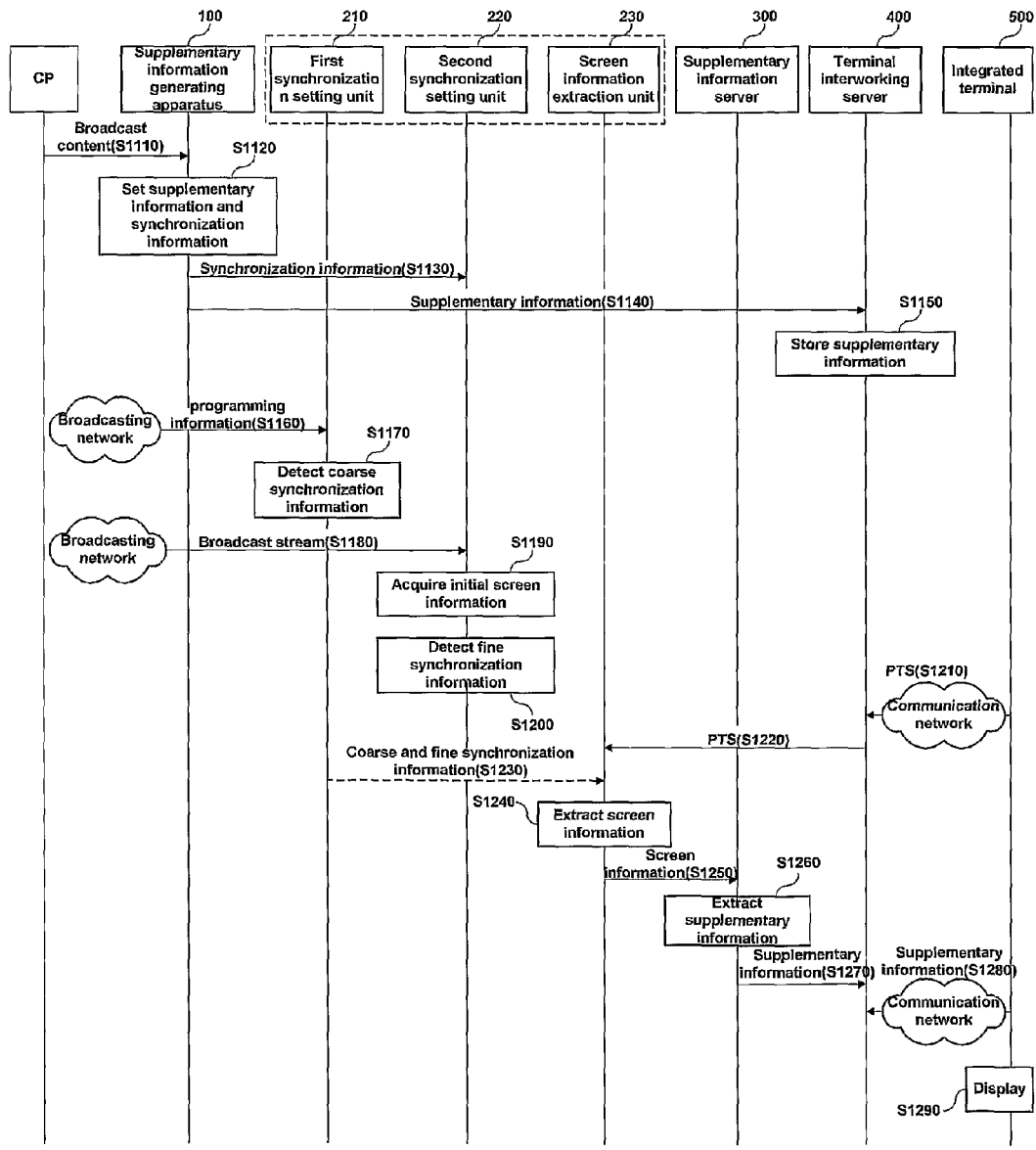
FIG. 13 is a schematic flowchart showing a method of synchronizing broadcast content with supplementary information according to a second embodiment of the present invention.

With reference to FIG. 13, a method of assigning access authority in a classification object basis according to a preferred embodiment of the present invention is described below. FIG. 13 is a schematic flowchart showing a method of synchronizing broadcast content with supplementary information according to a second embodiment of the present invention.

The supplementary information generating apparatus 100 first receives broadcast content provided by the CP, and generates and transmits supplementary information and synchronization information associated with the broadcast content at steps S1110 to S1140. Preferably, the supplementary information generating apparatus 100 generates supplementary information, including, for example, the story information, character information and background music information of a specific program, and information about products appearing in the program, and transmits the supplementary information to the supplementary information server 300. Furthermore, the supplementary information generating apparatus 100 generates synchronization information, such as the initial screen of a specific broadcast program, the scene change screen of the specific broadcast program, information about the time at which a scene was changed after a corresponding program had started, information about the time lag between the scene change screen and the initial screen of the specific program, and information about the characteristic value information of the initial screen or the scene change screen, and transmits the generated synchronization information to the synchronization server 200.

Thereafter, the supplementary information server 300 receives the supplementary information from the supplementary information generating apparatus 100 and stores the received supplementary information at step S1150.

Furthermore, the synchronization server 200 detects synchronization information, in which the time offset between the broadcast content, provided by the CP, and broadcast content, received over a broadcasting network, is considered, by comparing the broadcast content, received over the broadcasting network simultaneously with the step 1130, with the synchronization information, received from the supplementary information generating apparatus 100. More specifically, the first synchronization setting unit 210 receives programming information transferred via the EPG channel of the broadcasting network and detects coarse synchronization information, including information about the start time of a specific program on the broadcast content received from the CP, based on the received programming information at steps S1160 and S1170. At the same time, the second synchronization setting unit 220 extracts information about the scene change screen of the specific program on the broadcast content, received over the broadcasting network, based on the information about a scene change screen, received from the supplementary information generating apparatus 100, in order to supplement the coarse synchronization information, acquires information about the initial screen of the specific program on the broadcast content, received over the broadcasting network, based on information about the time lag between the screen change screen and the initial screen of the specific program, and detects fine synchronization information, including PTS information encoded in the acquired initial screen information, at steps S1180 to S1200.

Thereafter, the terminal interworking server 400 receives the PTS information of the broadcast content, corresponding to the time at which supplementary information was requested by the integrated terminal 500, over the communication network in response to the request of the integrated terminal 500, and provides the PTS information to the synchronization server at steps S1210 and S1220.

The synchronization server 200 that has received the PTS information extracts screen information, corresponding to the time at which the supplementary information was requested, using the time lag with respect to the PTS information, received from the terminal interworking server 400, based on synchronization information in which the time offset is considered at steps S1230 to S1250. More specifically, the screen information extraction unit 230 extracts screen information, corresponding to the time at which the supplementary information was requested, using the time lag with respect to the PTS information, received in response to the request for the supplementary information from the integrated terminal, based on the coarse synchronization information or the fine synchronization information, and transmits the extracted screen information to the supplementary information server 300.

Thereafter, the supplementary information server 300 extracts supplementary information associated with the extracted screen information transmitted from the synchronization server 400, and transmits the extracted supplementary information at steps S1260 and S1270.

Thereafter, the terminal interworking server 400 receives the extracted supplementary information from the supplementary information server 300, and provides the extracted supplementary information to the integrated terminal 500 over the communication network. The integrated terminal 500 that has received the supplementary information displays broadcast content, received over the broadcasting network, and the supplementary information, received from the terminal interworking server 400 over the communication network in response to a request and synchronized with the broadcast content, at steps S1280 and S1290.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

According to the system and method for synchronizing broadcast content with supplementary information according to the present invention, the accurate time information of a broadcast program that is viewed by a user can be obtained and synchronization is implemented based on the time information, so that the system and method can provide supplementary information, such as the story information, character information and background music information of broadcast content and information about products appearing in a program, while temporally accurately matching the supplementary information to the corresponding broadcast content, which varies in real time.

The invention claimed is:

1. A supplementary information server for providing a supplementary information associated with a specific broadcast program on a broadcast content, the supplementary information server comprising:
   a broadcasting receiving unit for receiving the broadcast content;
   a synchronization information unit for storing a synchronization information of the supplementary information associated with the specific broadcast program;
   a video comparison unit for comparing screens of the broadcast content with a previously stored scene change screen of the specific broadcast program and setting a start time of the specific broadcast program;
   a parsing unit configured to convert the synchronization information into vector values, wherein the video comparison unit is configured to compare the vector values of the broadcast content and the vector values of the synchronization information to a critical value; and
   a supplementary information extracting unit for calculating an elapsed time from the start time of the specific broadcast program to a specific screen and extracting the supplementary information corresponding to the elapsed time and a coordinate information received from a user terminal.

2. The supplementary information server as set forth in claim 1, wherein the supplementary information extracting unit receives a time information of the specific screen from the user terminal, calculates the elapsed time based on the received time information of the specific screen and the start time of the specific broadcast program, extracts the supplementary information corresponding to the elapsed time, and transmits the supplementary information to the user terminal.

3. The supplementary information server as set forth in claim 2, wherein the start time of the specific broadcast program and the time information of the specific screen includes at least one of PTS (Present Time Stamp) information, PCR (Program Clock Reference) information and frame number information.

4. The supplementary information server as set forth in claim 1, wherein the synchronization information of the supplementary information includes a time lag information of the scene change screen.

5. The supplementary information server as set forth in claim 1, wherein the synchronization information of the supplementary information includes information of the scene change screen.

6. The supplementary information server as set forth in claim 1, wherein the supplementary information server further comprises a unit for acquiring a start time information of the specific broadcast program from a program schedule information, and wherein the video comparing unit sets the start time of the specific broadcast program by supplementing the acquired start time information with the comparison.

7. A method for providing a supplementary information associated with a specific broadcast program on a broadcast content, the method comprising steps of:

receiving a synchronization information of the supplementary information associated with the specific broadcast program;

setting a start time of the specific broadcast program by comparing vector values of the specific broadcast program;

determining vector values of the synchronization information;

comparing the vector values of the specific broadcast program and the vector values of the synchronization information to a critical value;

calculating an elapsed time corresponding to a specific screen based on the start time; and extracting the supplementary information corresponding to the elapsed time and a coordinate information received from a user terminal.

8. The method as set forth in claim 7, further comprising a step of receiving a time information of the specific screen from the user terminal, and wherein the elapsed time being calculated based on the received time information of the specific screen and the start time of the specific broadcast program.

9. The method as set forth in claim 8, wherein the start time of the specific broadcast program and the time information of the specific screen includes at least one of PTS (Present Time Stamp) information, PCR (Program Clock Reference) information and frame number information.

10. The method as set forth in claim 7, wherein the synchronization information of the supplementary information includes a time lag information of the scene change screen.

11. The method as set forth in claim 7, wherein the synchronization information of the supplementary information includes information of the scene change screen.

12. The method as set forth in claim 7, further comprising a step of acquiring a start time information of the specific broadcast program from a programming schedule information included in the broadcast content;

and wherein the start time of specific broadcast program being set by supplementing the acquired start time information with the comparison.

13. The supplementary information server as set forth in claim 1, wherein the video comparison unit evaluates similarity between vector values of screens of the broadcast content and a vector value of the previously stored scene change screen of the specific broadcast program in order to compare screens of the broadcast content with a previously stored scene change screen of the specific broadcast program.

14. The supplementary information server as set forth in claim 1, further comprising a start time unit for recording and managing the start time set by the video comparison unit.

15. The supplementary information server as set forth in claim 13, wherein the vector unit is configured to select a vector method from the at least one of the full method, the cross method or the oblique method based on processing time, memory spacing and accuracy considerations.

16. The method as set forth in claim 7, further comprising recording and managing the start time.

17. The method as set forth in claim 7, wherein if a similarity between the vector values of the specific broadcast program and the vector values of the synchronization information is greater than the critical value, setting the start time to a time at which a corresponding screen of the specific broadcast program was broadcast.

18. A method for providing a supplementary information associated with a specific broadcast program on a broadcast content, the method comprising steps of:

receiving a synchronization information of the supplementary information associated with the specific broadcast program;

converting at least one screen into vector values based on at least one of a full method, a cross method or an oblique method;

converting the synchronization information into vector values;

setting a start time of the specific broadcast program by comparing vector values of screens of the broadcast content with vector values of a previously stored scene change screen of the specific broadcast program, and by comparing vector values of the synchronization information to a critical value;

calculating an elapsed time corresponding to a specific screen based on the start time; and extracting the supplementary information corresponding to the elapsed time and a coordinate information received from a user terminal.

* * * * *